Aug. 26, 1952 — G. L. TURNER — 2,608,315
INDUSTRIAL TRUCK
Filed Sept. 13, 1949 — 4 Sheets-Sheet 4

INVENTOR.
GEORGE L. TURNER
BY
ATTY

Patented Aug. 26, 1952

2,608,315

UNITED STATES PATENT OFFICE 2,608,315

INDUSTRIAL TRUCK

George L. Turner, Buchanan, Mich., assignor to Clark Equipment Company, Buchanan, Mich., a corporation of Michigan Application September 13, 1949, Serial No. 115,397

4 Claims. (Cl. 214—113)

The present invention relates generally to industrial trucks and more particularly to load supporting means for an industrial truck.

At present, industrial trucks of a character to which the present invention pertains, are provided with a vertically extending mast adjacent the forward end thereof, with which a suitable load supporting carriage is associated. The load supporting carriage is actuated vertically by means of a hydraulic piston and cylinder assembly. In the construction referred to a pair of frame members extend transversely of the truck and are secured to the load supporting carriage in a manner to permit vertical movement therewith. A plurality of forks are either hooked over the upper transverse frame member, or are bolted or otherwise suitably secured to the forward face of the transverse frame members to enable use of the truck for picking up and depositing loads.

This type of load supporting means is unsatisfactory for use with a heavy duty industrial truck for which the forks must of necessity support a load of substantial weight. The momentum of a heavy duty truck, when engaging a heavy load supported on a pallet may, if manipulated by an inexperienced driver, cause an impact between the junction of the vertical and horizontal legs of the forks.

An object of the present invention is to provide box-like transverse frame means providing for the support of a plurality of forks.

Preferably a pair of box-like frame means are arranged in vertically spaced relation on the load supporting carriage of the truck and each box-like frame means includes horizontally spaced apart front and rear walls between which the vertical leg portion of the forks are adapted to extend. The upper ends of the forks are preferably provided with detachable block members for engaging the upper edges of the front and rear walls of the upper box-like frame so that the forks are adapted to be raised upon raising of the load supporting carriage. The front surfaces of the front walls of the box-like frames are adapted to engage the rear surface of a load and are thus effective in preventing the lower rear edge of the load, or a pallet, if the load is supported thereby, from contacting the junction between the vertical and horizontal legs of the forks. This construction thus prevents an impact from occurring between the load and fork junctions thus eliminating damage to the pallet or load.

The aforementioned vertically extending mast of known trucks is tiltable either forwardly or rearwardly, by means of one or more hydraulic piston and cylinder assemblies, which are secured adjacent one of their ends to the frame of the truck, and adjacent their other ends to the mast. If the mast is tilted rearwardly with a load on the forks, the center of gravity of the load and the center of gravity of the mast is shifted to a position closer to the front wheels, thus providing greater stability for the truck. However, if the mast and load are tilted forwardly, the center of gravity of the mast and center of gravity of the load are shifted to a position forwardly of the front wheels, thus causing the truck to be unstable, which in extreme cases may result in overturning of the truck.

A further object of the present invention is to provide an industrial truck with a mast fixed adjacent the forward end of the truck, and with which a tilting mechanism is arranged for vertical movement relative thereto. The tilting mechanism provides for the support of suitable transverse frame means which may be either of the known or improved forms above referred to, and which in turn provide for the mounting thereon of suitable lift forks or other load engaging means, and is adapted to be tilted either forwardly or rearwardly as desired by the operator in manipulating the truck. By providing a tilting mechanism as presently proposed, the center of gravity of the mast remains stationary, for it is fixed to the truck, and the center of gravity of the load carried on the fork supporting frames is shifted only a short distance toward or away from the front wheels of the truck, depending on whether the load is being tilted forwardly or rearwardly.

The advantage of the tilting mechanism of the present invention over the conventional tilting mast, is that even when the tilting mechanism is moved upward to the top of the mast, the center of gravity of a load carried thereon is shifted only a few inches when the tilting mechanism is actuated either forwardly or rearwardly, whereas if a load is moved to the top of a conventional mast, and that mast is tilted forwardly, the center of gravity of the load is shifted considerably forward of the truck, which may produce a movement sufficient to cause the truck to overturn.

Now in order to acquaint those skilled in the art with the manner of constructing and using the devices embodying the principles of the present invention, certain preferred embodiments of the invention will be described.

Figure 1:
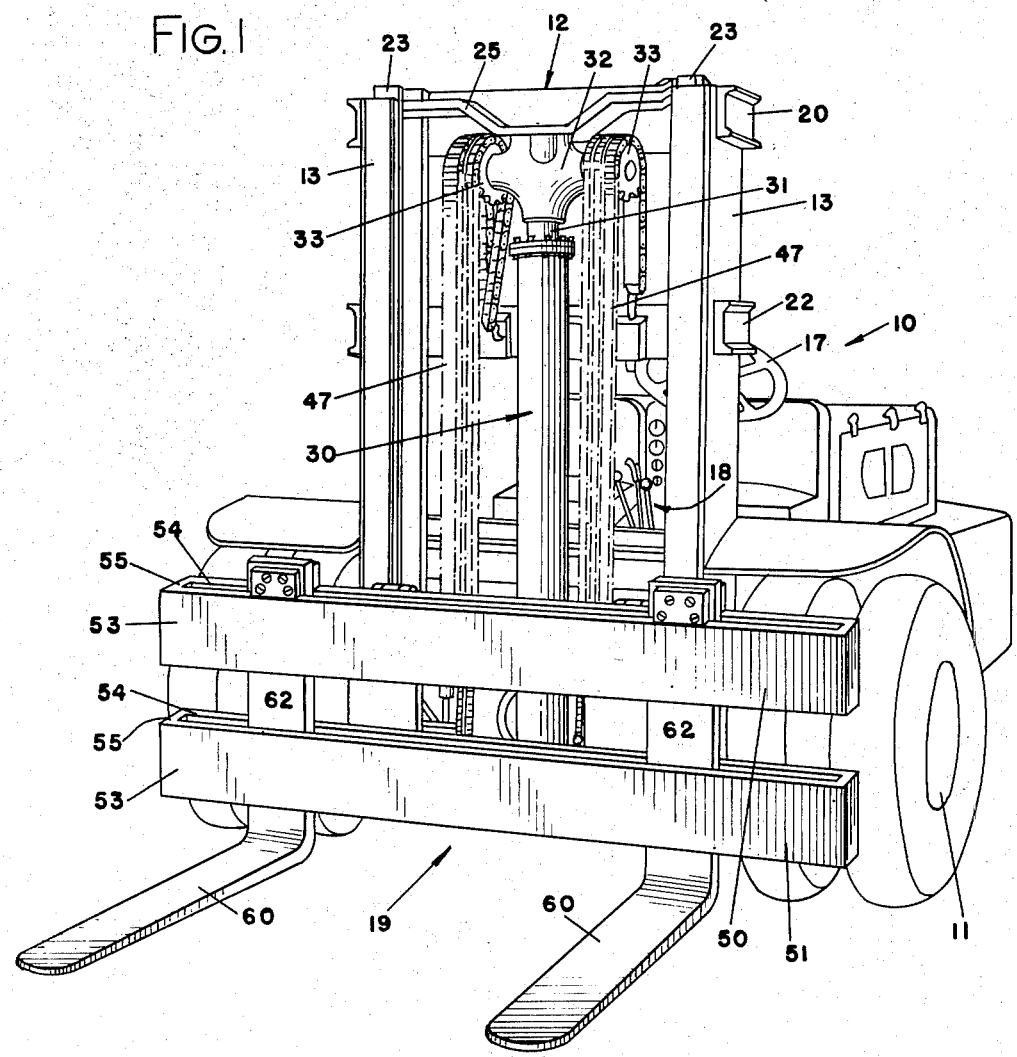
Figure 1 is a front perspective view of an industrial truck incorporating the principles of the present invention.

Referring now to Figure 1, there is shown an industrial truck indicated generally by the reference numeral 10 having a main frame (not shown) to which a transversely extending drive axle assembly is mounted adjacent the forward end thereof. Mounted adjacent each end of the drive axle assembly are a pair of drive wheels 11. A pair of dirigible type wheels (not shown) are disposed closely adjacent to each other and are located adjacent the rear portion of the frame centrally of the sides thereof. The pair of rear steering wheels are adapted to be rotated for steering the truck by means of a steering linkage mechanism, which is actuated by means of the steering column 16 and steering wheel 17, which are disposed adjacent the forward end of the truck. The truck is further provided with suitable prime mover means, clutch and brake means and a plurality of control levers, indicated generally at 18, for effecting actuation of the various mechanisms of the truck. The truck shown in Figure 1 per se is further described in detail in the co-pending application of Robert Lapsley and George L. Turner, Serial No. 115,982, filed September 16, 1949. The truck is illustrative only of one suitable form of industrial truck to which the present invention is applicable and it will be understood that the truck may vary widely in its construction and form. The only requirements of the truck necessary for purposes of the present invention is that it be capable of the support of a mast, and should preferably embody suitable pump means driven for example, by the prime mover means to provide a source of fluid under pressure to effect raising of a load and actuation of the tilting mechanism to be hereinafter described.

A mast indicated generally at 12 is mounted in fixed position at the forward end of the main frame. The mast 12 in the main is of known construction and comprises a pair of C-shaped channel members 13 which are disposed in spaced apart parallel relationship and extend vertically adjacent each side of the main frame. The C-shaped members 13 are held in fixed spaced relation at their upper ends by means of a C-shaped bracket 20 secured at its opposite ends to the upper portions of each of the C-shaped channel members 13. A second C-shaped bracket member 22 is secured adjacent its ends to an intermediate portion of each of the C-shaped channel members 13. Within each of the C-shaped channel members is an inner sliding channel member 23. The channel members 23 are held in spaced apart relation by means of a suitable transverse cross member 25 extending between and secured to the upper portions thereof.

Figure 4:
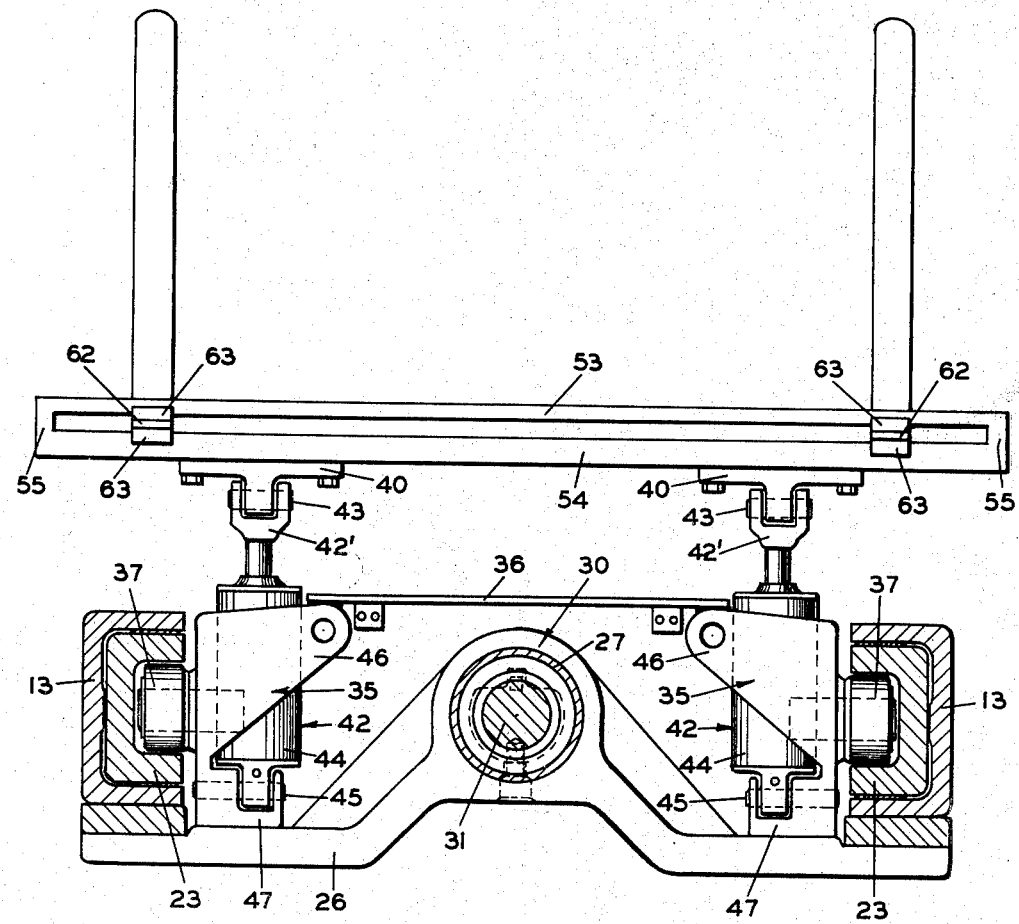
Figure 4 is a sectional view taken substantially along the line 4—4 in Figure 2 looking in the direction indicated by the arrows.

The lower ends of the channel members 13 are suitably secured to a platform bracket 26, as shown in Figure 4, which is suitably secured to the main frame of the truck. The platform bracket 26 has a recess 27 formed therein which is adapted to receive the lower portion of a vertically extending cylinder of a hydraulic piston and cylinder actuating assembly indicated generally by the reference numeral 30. Mounted to the free end of the piston rod 31 of the hydraulic piston and cylinder assembly is a pinion housing 32 to which a pair of pulley and bracket assemblies 33 are secured one adjacent each end thereof about an axis extending transversely of the piston 31. The pinion housing adjacent its upper end is suitably secured as by bolts to the cross frame member 25.

Figure 2:
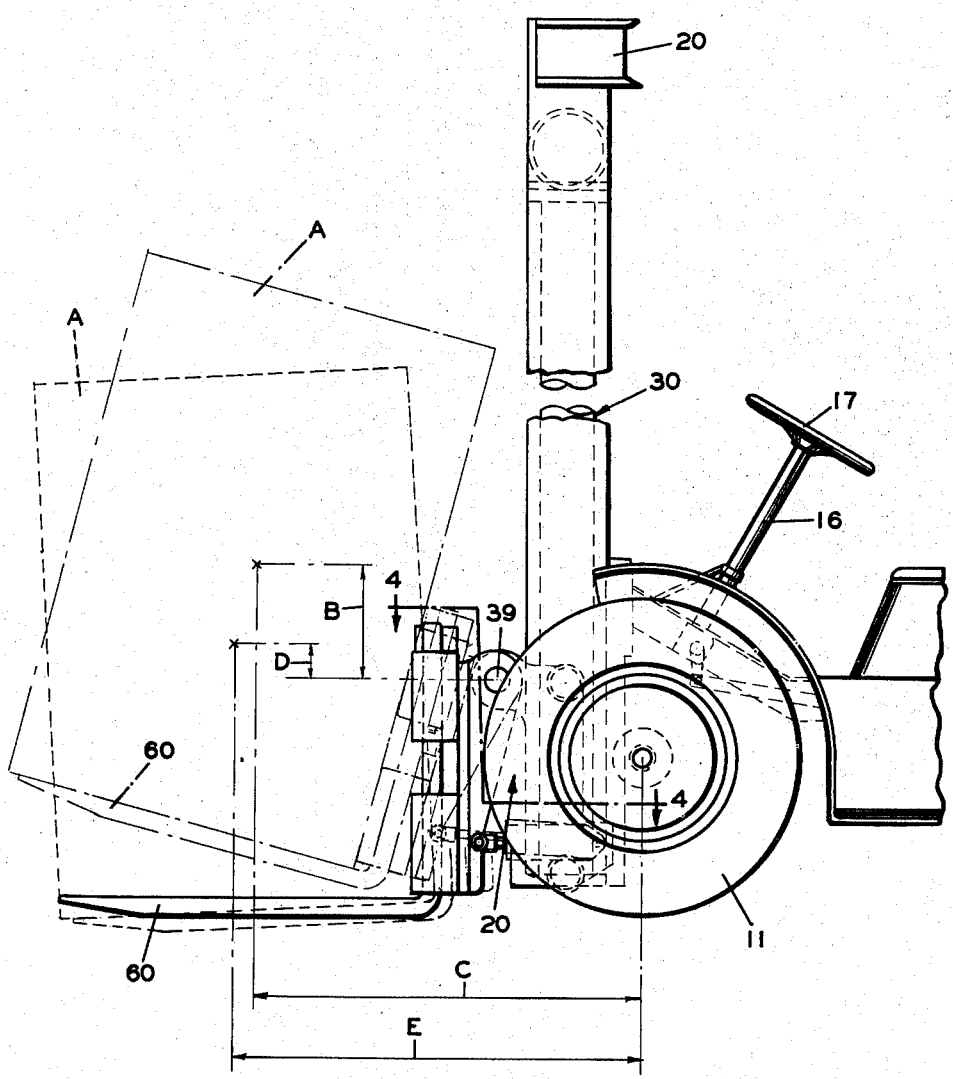
Figure 2 is a side elevational view of the front portion of the truck of Figure 1 showing a load in dotted lines being tilted forwardly and the same load in dot and dash lines being tilted rearwardly.
Figure 3:
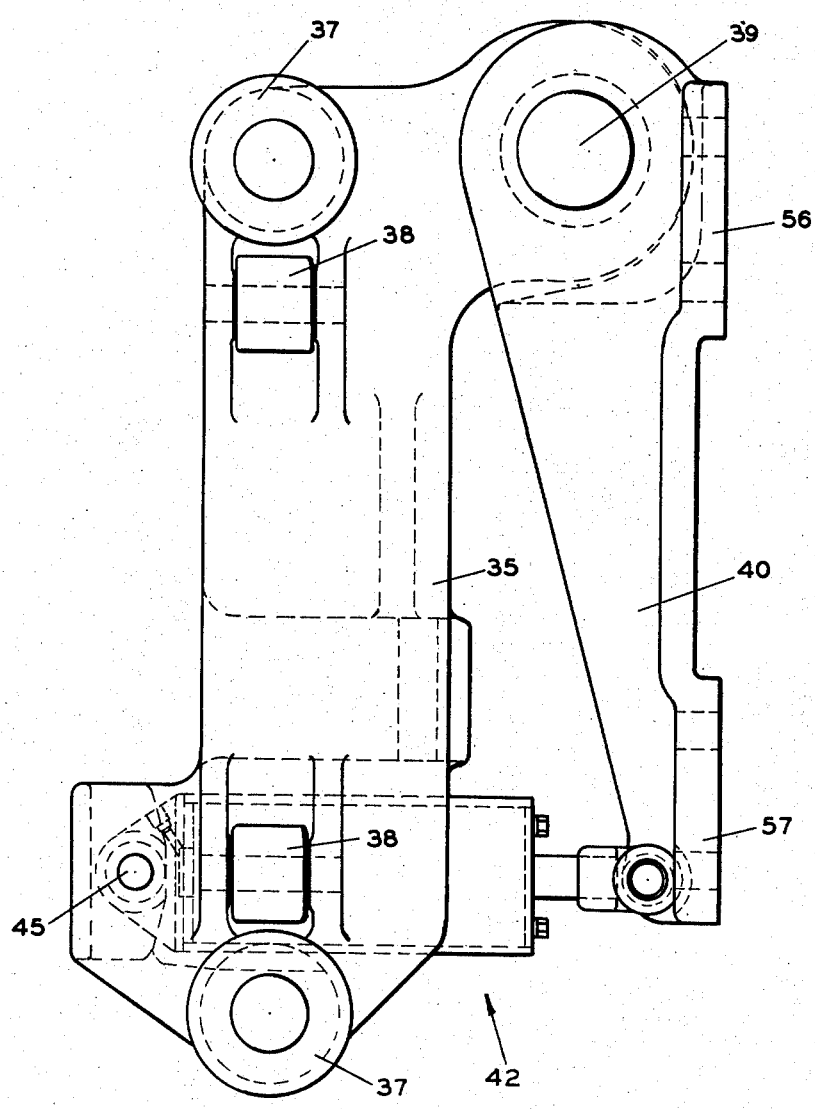
Figure 3 is a side elevational view of the tilting mechanism of my present invention.

Referring now particularly to Figures 2, 3 and 4, I shall describe in connection therewith the tilting mechanism and transverse box-like frames which form the subject matter of the present invention. Disposed adjacent the inwardly facing side of each of the inner channel members 23 is a vertically extending frame member 35. The frame members 35 interconnected adjacent their forward end by means of a transverse horizontal brace member 36. Rotatably mounted to the upper and lower portion of each of the vertically extending frame members are a pair of rollers 37 disposed laterally outwardly therefrom which are adapted to have rolling engagement with the side walls of the inner C-shaped channel members 23. A second pair of rollers 38 are provided for each of the vertically extending frame members, and are disposed laterally outwardly therefrom adjacent to and inwardly of the first rollers 37. The second pair of rollers 38 are adapted to have rolling engagement with the bight portion of each of the C-shaped channel members. Pivotally secured to each of the upper forward ends of the vertically extending frame members 35 as at 39 is a downwardly depending load carrying frame member 40. A pair of hydraulic piston and cylinder assemblies 42 are disposed between the lower end portions of frame members 35 and 40, and the outer end of each of the pistons is provided with a clevis 42' having pivotal connection as at 43 with the lower ends of the load carrying frame members 40. The closed ends of cylinders 44 have pivotal connection as indicated at 45 with the bifurcated inner end portions 47 of each of the frame members 35. Thus it will be seen that the load carrying frame members 40 may be pivoted about their axes 39 by actuating the hydraulic piston and cylinder assemblies, either inwardly or outwardly, as may be desired.

Intermediate of the ends of the vertically extending frame members are a pair of horizontal inwardly extending flanges 46, to which one end of a pair of chains 47 are secured. The chains are trained about the pulleys of aforementioned bracket assemblies 33 and are secured adjacent their other ends to the intermediate C-shaped horizontal cross member 22, which is secured to the intermediate portions of the outer vertically extending C-shaped channel members 13 of the mast for maintaining the same in fixed spaced relation.

Thus upon the admission of fluid under pressure to the cylinder 30, the aforedescribed inner channels 23 and frames 35 and 40 may be caused to be raised to elevate a load supported by frames 40, as will be described.

The load carrying frame members 40 provide for the support of upper and lower transversely extending box-like frame members 50 and 51, as best shown in Figure 1. Each of the box-like frame members is defined by spaced front and rear walls 53 and 54 connected at their opposite ends by suitable end walls 55. The several walls may be made as separate parts welded together to form the structure described. As best shown, the load carrying frames 40 have upper end lower pad portions 56 and 57 to which the box-like frames 50 and 51 may be secured, as by bolts or the like. A pair of forks 60 are adapted to be supported by the box-like frame members 50 and 51 for vertical movement relative thereto. The forks 60 each include a vertically extending leg portion 62 adapted to be disposed between the inner surface of the front and rear walls 53 and 54 and suitable block members 63 are secured as by bolting to opposite surfaces of the upper ends of the leg portions 62 above the upper box-like supporting frame 50. By virtue of the construction described, the block members 63 support the forks in the upper edges of the upper box-like frame 50 and the leg portions 62 are supported between the front and rear walls of each of the frames 50 and 51. This construction further permits of the transverse adjustment of the forks. As previously related, the forks 60 are of substantial weight so that they normally will not shift laterally. However, if desired, suitable means may be provided, as by the insertion of spacer blocks between the front and rear walls of the box-like supporting frames for limiting relative lateral movement of the forks.

If it is desired to lift the tilting mechanism of my present invention, one of the suitable control levers of the group at 18 is manipulated to thereby admit fluid under pressure to the hydraulic piston and cylinder assembly 30. When the piston rod of the hydrualic piston and cylinder assembly 30 is forced upwardly the inner C-shaped channel members 23 are carried upwardly therewith. The wheels of the assemblies 33 mounted to the sides of the pinion housing 32 are moved upwardly therewith and the chains 47 which are secured to the intermediate C-shaped brace member 22 and the flanges 46 of the frames 42 move the latter upwardly. As may be readily understood, when the inner C-shaped channel members 23 have reached their upper limit of movement that the tilting mechanism of the present invention will be located adjacent the upper portion thereof.

If it should be desired to lower the mast and tilting mechanism the appropriate lever of the group at 18 is suitably manipulated to bleed fluid under pressure from the cylinder of the piston and cylinder assembly 30. The weight of the mast and associated parts is sufficient to force the piston rod 31 downwardly to the desired lowered position. Tilting of the forks 60 may be effected by the selective admission of fluid under pressure to the cylinders of the piston and cylinder assemblies 42. Thus if the piston rods of the hydraulic piston and cylinder assemblies 42 are caused to be moved outwardly under the pressure admitted to cylinders 44, the vertically extending frame members 35 will pivot about axes 39 in a counter-clockwise direction as viewed in Figure 2, to dispose the forks 60 in the dot-dash line position of this figure. Upon admission of fluid under pressure to cylinders 44 to effect movement of the piston rods inwardly, the frame members 40 will be pivoted about axes 39 in a clockwise direction as viewed in Figure 2 and dispose the forks in the dotted line position of this figure. It will be understood that the tilting mechanism of my invention works independently of its vertical position within the inner C-shaped channel members 23 of the mast. Thus the tilting mechanism may be operated at its lowermost position or at its uppermost position in the mast.

The construction above described is of advantage in that the center of gravity of a load supported on the forks 60 of the truck only varies slightly from its position when the forks are horizontal. Assuming the center of gravity indicated at X in Figure 2 of a load identified as A is higher than the axes 39 of the frame members 40 as indicated by line B and the load is tilted rearwardly to the dot-dash line position shown in this figure, the center of gravity as exemplified by line C moves toward the drive wheels 11. If the center of gravity of the load is lower than the pivotal axes 39 of the frame members 40, then the center of gravity moves slightly away from the drive wheels 11. The reverse is true when the load is tilted forwardly. In other words, assuming again that the center of gravity X of load A is higher than pivot point 39 as indicated by line D and the forks are tilted forwardly, the center of gravity moves slightly away from wheels 11 as indicated by line E. However, if the center of gravity of the load is lower than axes 39, then the center of gravity tends to move toward the drive wheels 11. The advantage of this arrangement lies in the fact that even though the lift carriage defined by frame members 35 and 40 is at the top of the uprights or mast, the center of gravity is moved only a small amount upon tilting of the forks 60.

The transverse box-like frame members 50 and 51 which have been previously described are particularly adapted for use in connection with heavy duty industrial trucks. In this connection, the forks are of substantial weight. By using the present construction of the box-like frame members the forks may be aligned in a position below the box-like frame members so as to pass through the openings formed therein when the box-like frame members are lowered on the mast. It is then only necessary to fasten the pair of plate members 63 to the upper most portions of the forks.

While I have shown and described what I consider to be a preferred embodiment of my invention, it will be understood that various modifications and rearrangements may be made therein without departing from the spirit and scope of my invention.

I claim:

1. In combination, an industrial truck having a main frame, a vertical mast fixedly mounted to the forward end of said main frame, a pair of vertically extending spaced apart frame members mounted for vertical movement in said mast, means for inter-connecting said frame members whereby the latter are vertically movable in unison within said mast, a pair of downwardly depending load carrying frame members one pivotally secured to each of the upper forward ends of said vertically extending frame members about a common axis extending transversely of said truck, a pair of substantially forwardly horizontally extending hydraulic piston and cylinder assemblies one disposed laterally inwardly of each vertically extending frame member with the closed ends of the cylinders of said hydraulic piston and cylinder assemblies having pivotal connection one to the lower portion of each of said vertically extending frame members, and with the outer ends of the pistons of said hydraulic piston and cylinder assemblies having pivotal connection one to the lower portion of each of said downwardly depending load carrying frame members whereby said hydraulic piston and cylinder assemblies upon actuation thereof effect pivoting of said load carrying frame members about said axis.

2. Load supporting means for an industrial truck or the like, comprising a box-like frame having spaced apart elongated front and rear walls connected at their opposite ends by end walls, at least one load supporting fork of substantially L-shape having the vertical leg portion thereof disposed between the inner surfaces of said front and rear walls, and stop means secured to the upper end portion of the vertical leg of said fork for normally engaging the upper edges of said front and rear walls whereby said fork is supported by said box-like frame when the latter is in an elevated position.

3. Load supporting means for an industrial truck or the like, comprising a pair of vertically spaced and aligned box-like frame members each having spaced apart elongated front and rear walls connected at their opposite ends by end walls, at least one load supporting fork of substantially L-shape having the vertical leg portion thereof disposed between the inner surfaces of said front and rear walls of both of said box-like frame members, and stop means secured to the upper end portion of the vertical leg of said fork for normally engaging the upper edges of said front and rear walls of the upper box-like frame member whereby said fork is supported by said box-like frame member when the latter is in an elevated position.

4. In combination, an industrial truck having a main frame, a vertical mast fixedly mounted to the forward end of said main frame, a pair of vertically extending spaced apart frame members mounted for vertical movement in said mast substantially within the confines of the latter, means for inter-connecting said frame members whereby the latter are vertically movable in unison within said mast, a pair of downwardly depending load carrying frame members one pivotally secured to each of the upper forward ends of said vertically extending frame members about a common axis extending transversely of said truck, a pair of substantially forwardly horizontally extending hydraulic piston and cylinder assemblies one disposed laterally inwardly of each vertically extending frame member with the closed ends of the cylinders of said hydraulic piston and cylinder assemblies having pivotal connection one to the lower portion of each of said vertically extending frame members, and with the outer ends of the pistons of said hydraulic piston and cylinder assemblies having pivotal connection one to the lower portion of each of said downwardly depending load carrying frame members whereby said hydraulic piston and cylinder assemblies upon actuation thereof effect pivoting of said load carrying frame members about said axis, and the cylinders of said hydraulic piston and cylinder assemblies lying substantially within the confines of said mast.

GEORGE L. TURNER.

REFERENCES CITED

The following references are of record in the file of this patent:

UNITED STATES PATENTS

| Number | Name | Date |
| --- | --- | --- |
| 1,845,043 | Cochran | Feb. 16, 1932 |
| 1,875,103 | Mosel | Aug. 30, 1932 |
| 2,178,369 | Dunham | Oct. 31, 1939 |
| 2,234,851 | Asper | Mar. 11, 1941 |
| 2,271,624 | Cochran | Feb. 3, 1942 |
| 2,361,333 | Towson | Oct. 24, 1944 |
| 2,368,122 | Dunham | Jan. 30, 1945 |
| 2,427,301 | Puim | Sept. 9, 1947 |